UNITED STATES PATENT OFFICE.

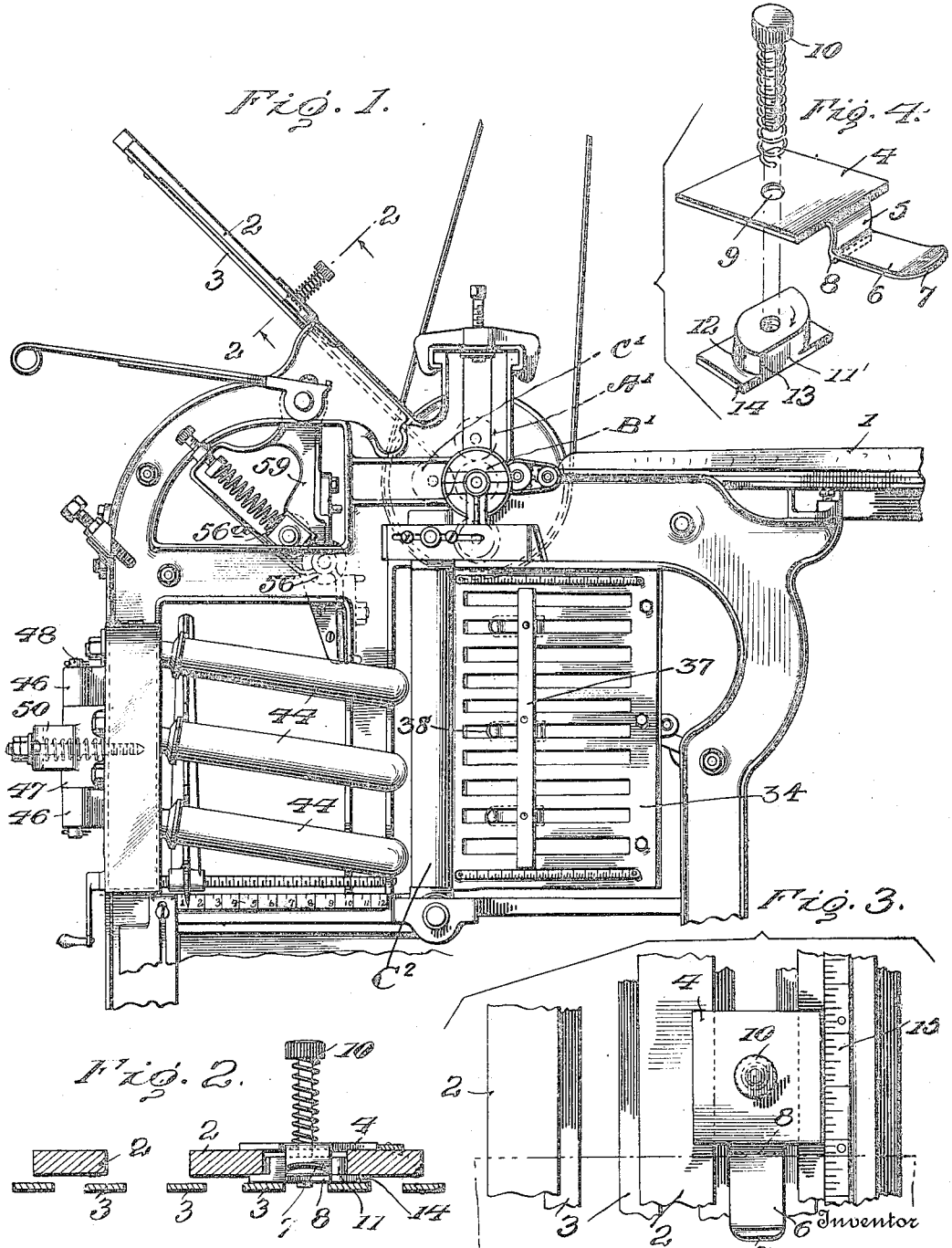

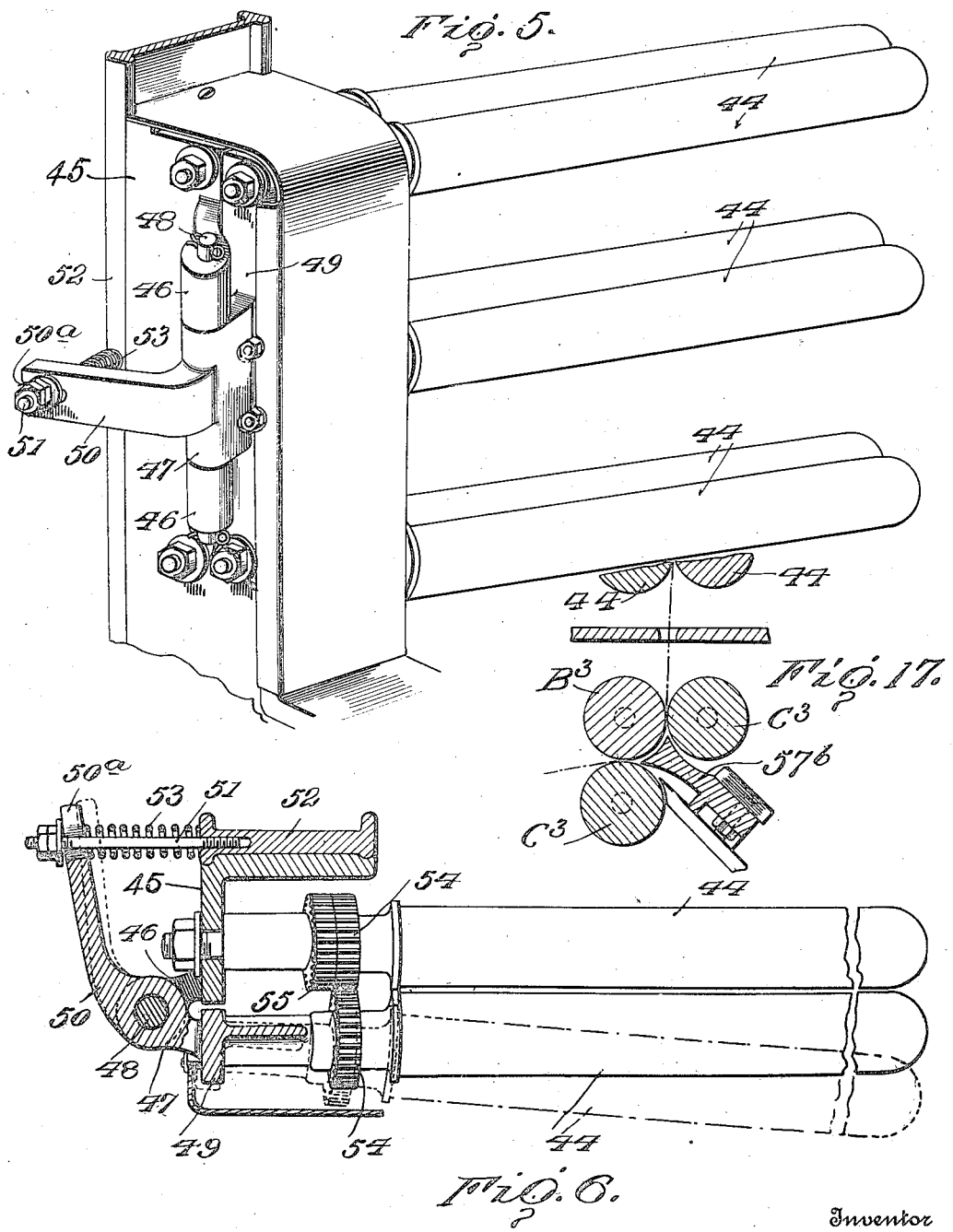

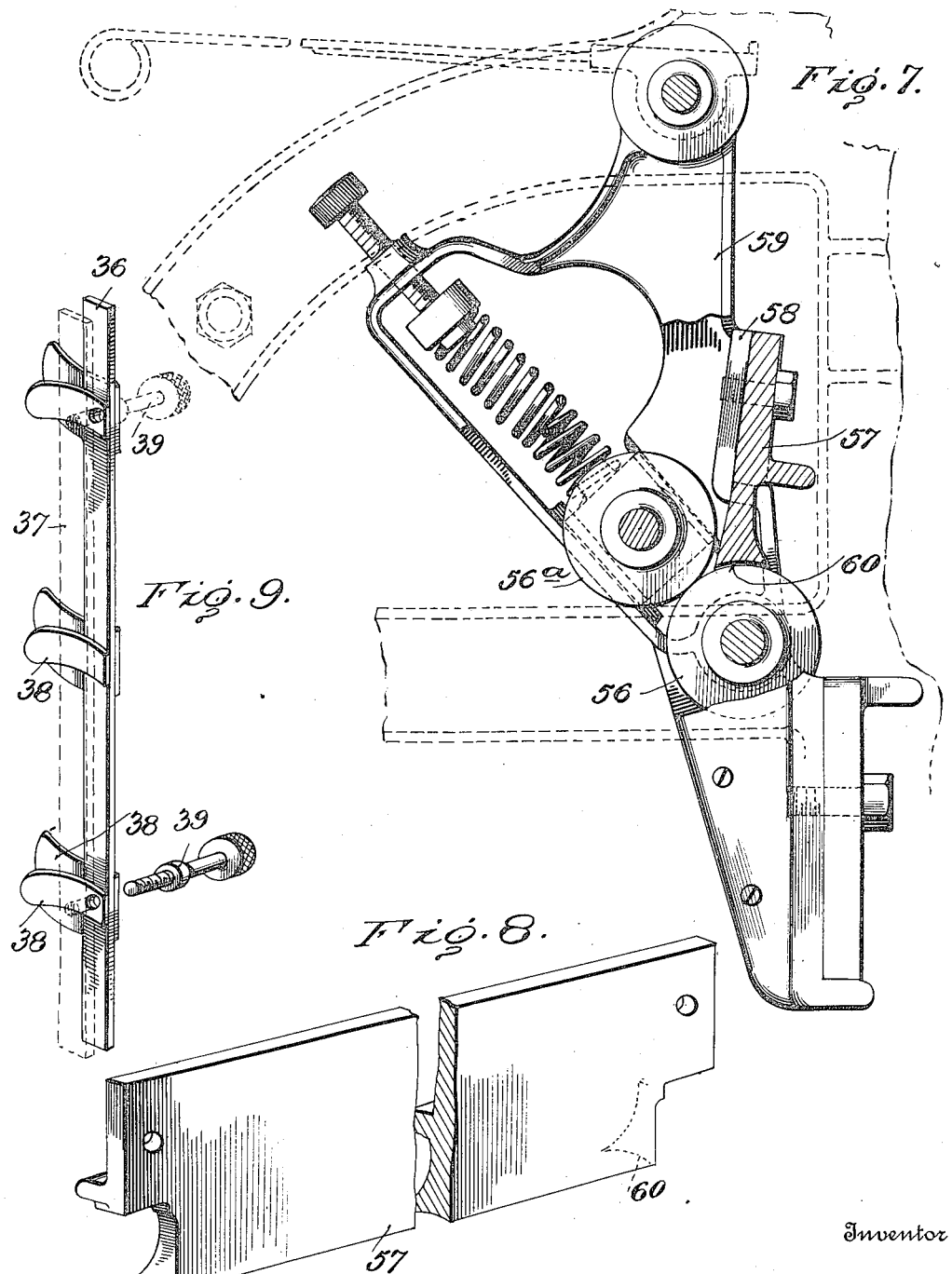

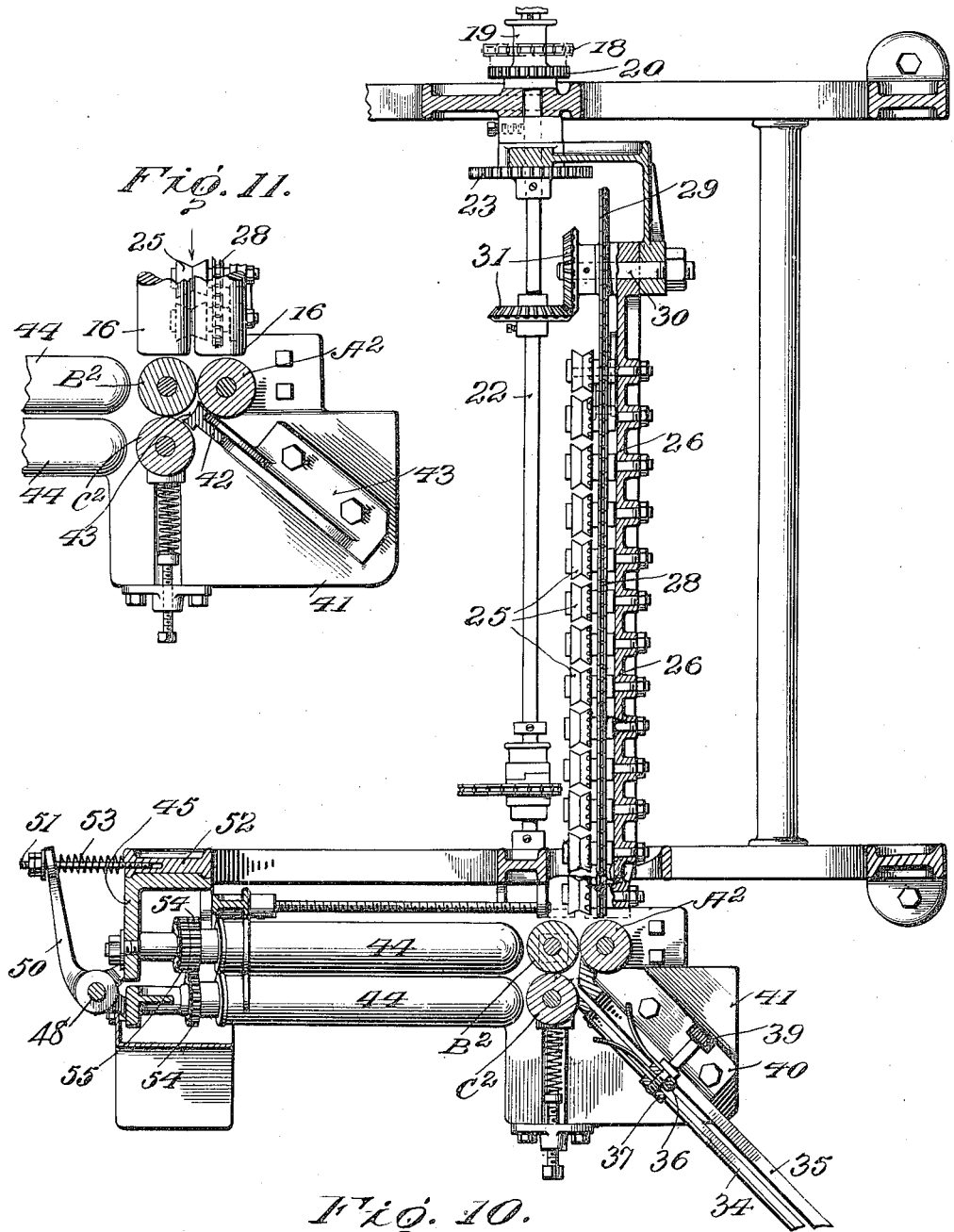

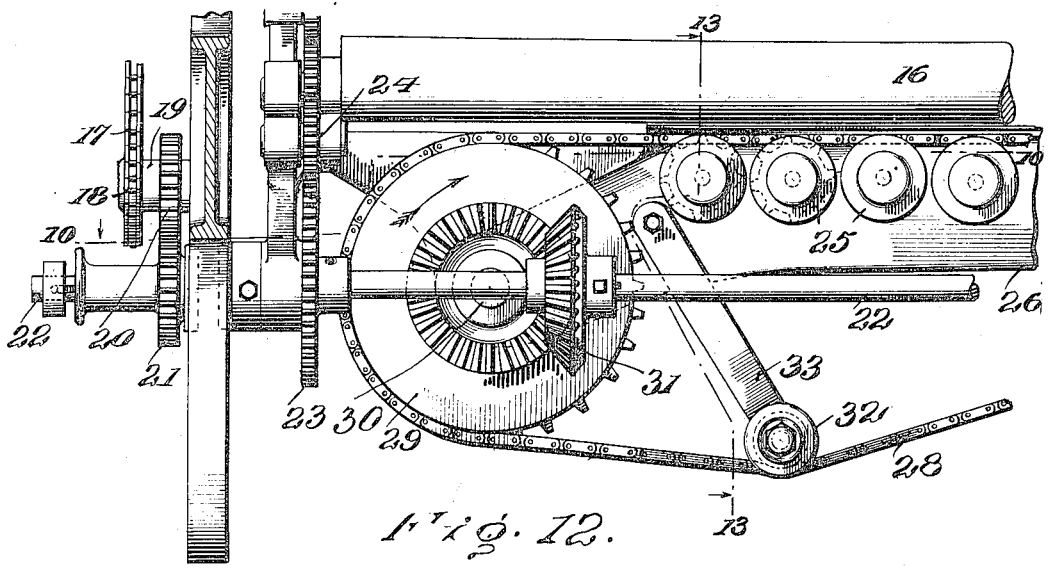
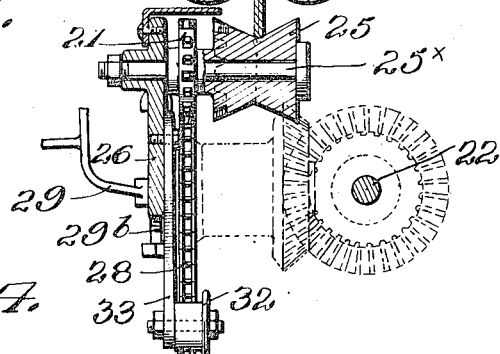
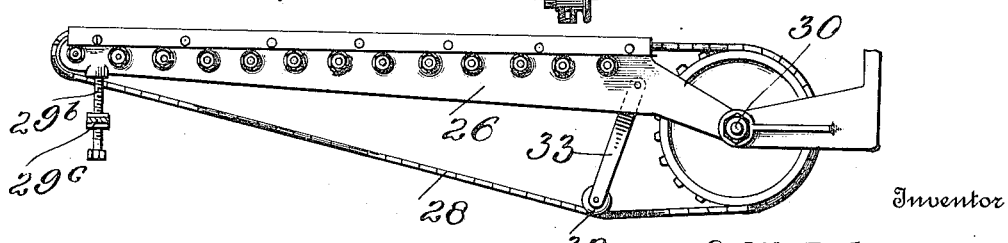

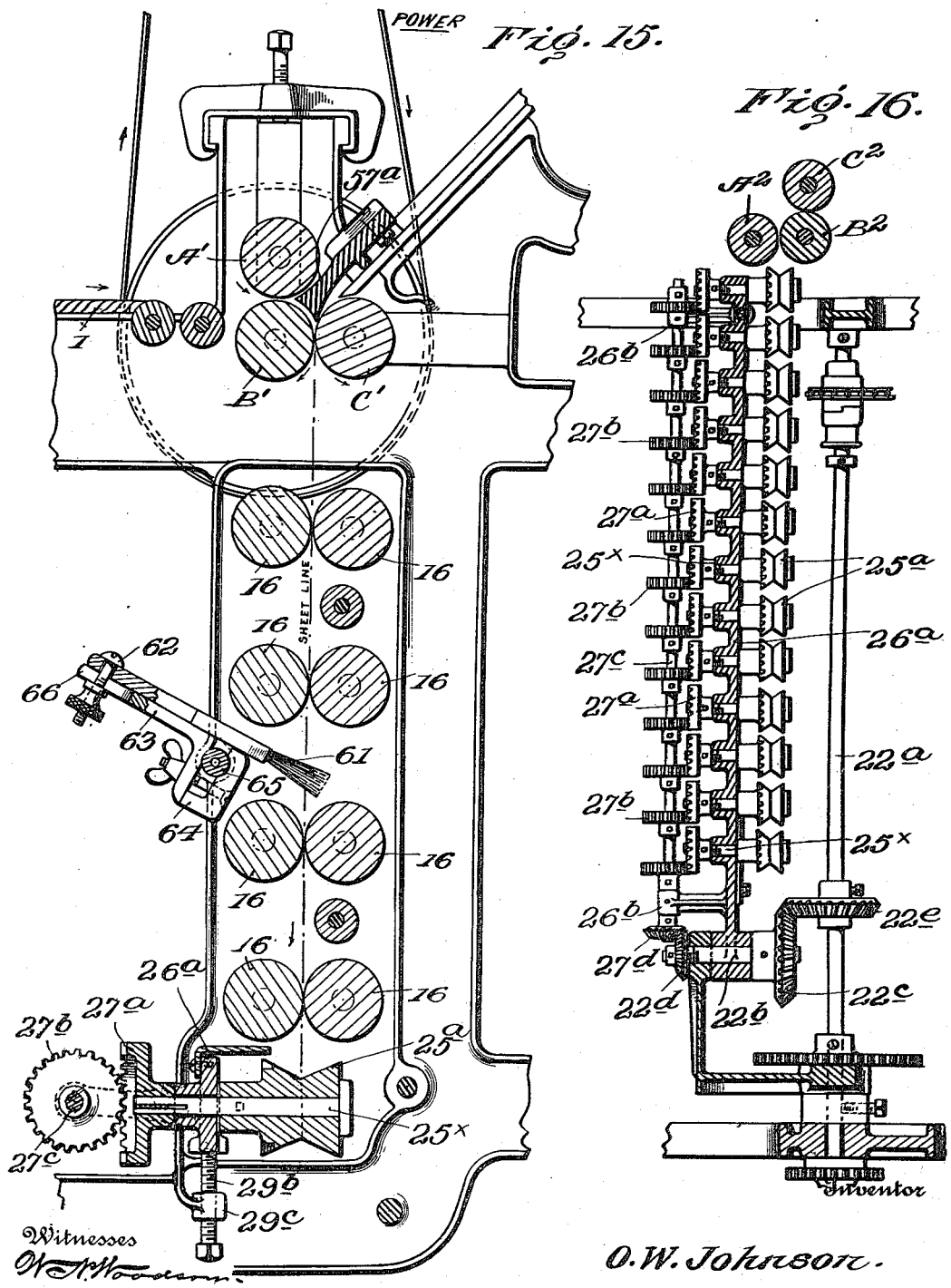

OLIVER W. JOHNSON, OF GENEVA, OHIO, ASSIGNOR, BY MESNE ASSIGNMENTS, TO THE CLEVELAND FOLDING MACHINE COMPANY, OF CLEVELAND, OHIO, A CORPORATION OF OHIO.

FOLDING-MACHINE.

1,151,015.

Specification of Letters Patent.  Patented Aug. 24, 1915.

Application filed January 13, 1910. Serial No. 537,944.

*To all whom it may concern:*

Be it known that I, OLIVER W. JOHNSON, citizen of the United States, residing at Geneva, in the county of Ashtabula and State of Ohio, have invented certain new and useful Improvements in Folding-Machines, of which the following is a specification.

This invention comprehends certain new and useful improvements in that class or type of paper folding machines that operate upon the sheet buckling principle, and relates particularly to improvements in the machine disclosed in my former Letters Patent of the United States, #893,629, dated July 21, 1908.

One of the main objects of the present invention is the provision of certain improvements in the means which is embodied in the cross feed mechanism of the device which is arranged, in the operation of right angle folding, to pass the once folded sheet to the second folder in order that the latter may make a second fold at right angles to the first fold, said improvements consisting in the employment of specially devised and arranged rollers and actuating mechanism therefor to take the place of the horizontally disposed belt in the patent above mentioned.

Another object of the invention is an improved stop device to be used in connection with the first folder and arranged to stop the sheet at the desired point so that the sheet may be buckled.

The invention also has for its object, an improved construction and arrangement of stop for use in the folders which make the second and third folds in a sheet in the operation of right angle folding.

Another object of the invention is the employment of deflectors which are arranged to pass the paper directly through certain of the folding rolls as will be hereinafter more specifically described on to the other parts of the mechanism whenever it is desired to cut out a fold. And a further object of the invention is an improved arrangement of obliquely disposed rolls designed to feed the paper downwardly from the second folder in the right angle series to the third folder, such rolls being so arranged that they may diverge more or less according to the requirements of the case, for instance the thickness of the stock employed.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings in which:

Figure 1 is a side elevation of a portion of a paper folding machine embodying the improvements of my invention; Fig. 2 is a detail sectional view on an enlarged scale, the section being taken substantially on the line, 2—2 of Fig. 1, through the plate of the first folder; Fig. 3 is a top plan view of the stop which is illustrated in the preceding sectional view; Fig. 4 is a detail view of the stop detached, with parts extended from each other and in juxtaposition; Fig. 5 is a perspective view of the obliquely disposed down feed rolls which are arranged to pass the paper from the second right angle folder to the third folder in the right angle series; Fig. 6 is a horizontal sectional view through the supporting device for the oblique rolls; Fig. 7 is a horizontal sectional view on an enlarged scale through a portion of the parallel folding mechanism illustrating one of the deflectors which is employed; Fig. 8 is a perspective view of such deflector; Fig. 9 is a perspective view partly in full lines and partly in dotted lines of the stop for the second and third folders in the right angle series; Fig. 10 is a horizontal sectional view through a portion of the machine, the section being taken on a line which will show the bottom portion of the cross feed mechanism and some of the obliquely disposed rolls, the plane of the section being indicated by the line 10—10 in Fig. 12; Fig. 11 is a view similar to Fig. 10 but taken on a slightly higher plane and to show the use of a deflector at the second folder in the right angle series; Fig. 12 is a side elevation, partly broken away of a portion of the cross feed mechanism; Fig. 13 is a detail sectional view on the line 13—13 of Fig. 12; Fig. 14 is a side elevation of the bar which supports the spools which form part of the means for passing the once folded sheet to the second set of folders in the operation of right angle folding; Fig. 15 is an enlarged transverse sectional view, the section being taken through the down feed portion of the cross feed mechanism designed to pass the once folded sheet to the second set of folders in the operation of right angle folding and illustrating a brush which may be employed as well as a deflector which may be used to pass the sheet directly from the feed table to the second set of folders without being acted upon by the first set of folders; Fig. 16 is a detail horizontal sectional view illustrating a modification in the means for driving the spools; and, Fig. 17 is a detail sectional view illustrating the use of a deflector for the rolls of the third folder.

Corresponding and like parts are referred to in the following description and indicated in all the views of the accompanying drawings by the same reference characters.

The paper to be folded passes from a feed table 1, in between the rollers $A^1$ and $B^1$ of the first folder upwardly between the longitudinally slotted and superposed plates 2 and 3 which are spaced from each other as best illustrated in Fig. 1, the sheet being engaged by a stop device illustrated best in Figs. 2, 3 and 4, and caused to buckle by the continued rotation of the rolls $A^1$ and $B^1$ so that it will be caught between the roll $B^1$ and the third roll $C^1$ of the first folder whereby to make the first fold in the sheet, the folded sheet being then passed down from the rolls $B^1$ and $C^1$ into the cross feed mechanism. This stop just above referred to comprises a plate 4 which may be rectangular as shown and which is adapted to lie upon the upper plate 2 of the folder across one of the slots of said plate. The plate 4 is formed at its front edge with a downwardly extending foot 5 terminating in a forwardly projecting toe 6 preferably formed with a slightly upwardly curved free extremity 7. The foot 5 with its toe 6 extends downwardly into the slot of the plate 2 over which the plate 4 is placed so as to guide the paper properly into engagement with a downwardly extended heel portion 8 formed at the juncture of the foot 5 and toe 6 and depending therefrom. This heel 8 constitutes the element with which the advanced edge of the paper directly contacts. In order to hold the plate 4 with the parts which it carries under the requisite tension relative to the plates 2 and 3 according to the size of the sheet and the fold which is desired, I have, in the present instance, provided the plate 4 with an aperture 9 through which a spring pressed bolt 10 projects downwardly into threaded engagement with a nut 11. The nut 11 is formed with oppositely curved edges 12 terminating in shoulders 13 and is also formed below said edges and shoulders with oppositely extended lugs 14. The nut 11 is adapted to fit in the slot over which the plate 4 extends with its lugs 14 extending underneath the plate 2, and between the latter and the plate 3, and with the shoulders 13 bearing tightly against the opposite walls of the slot. It will thus be understood that the oppositely curved walls 12 of the nut terminating in the shoulders 13 will cause said nut to securely bind in the slot when the bolt 10 is screwed down against the tension of its encircling spring whereby to securely hold the plate 4 in any desired adjusted position. In order to entirely remove the plate and its concomitant parts, it is only necessary to loosen the bolt 10 sufficiently to permit the turning of the nut 11 into alinement with the slot in which it has been placed whereupon the nut may be readily detached. Preferably the top plate 2 of the folder has a scale 15 secured to it as indicated in Fig. 3 so that the position of the plate 4 may be determined in advance, without experimenting, according to the work in hand.

As will be seen by reference to my prior patent before mentioned, as well as the accompanying drawings, in which the same parts are illustrated, I have provided my improved folding machine with what I have termed "cross feed mechanism" arranged to automatically pass the once folded sheet to the second folder in the right angle series so that the latter will make a second fold at right angles to the first. This cross feed mechanism embodies a series of horizontally disposed rolls 16 arranged in pairs as best illustrated in Figs. 11 and 12, 13 and 15, the once folded sheet being received directly by the uppermost pair of rolls 16 as it comes out from between the folder rolls $B^1$ $C^1$ in its downward movement and being passed successively from one pair of rolls to the next pair below until the then once folded sheet comes into contact with the laterally moving part of the cross feed mechanism. It is in this laterally movable part of the cross feed mechanism that the present invention differs in one respect from the prior patent before mentioned, but before describing the same, it should be remarked that in the present embodiment of the device, these rolls 16 receive their motion preferably by the following means. A sprocket chain 17 extends around a sprocket wheel 18 on a stub shaft 19 which projects out from one side bar of the supporting framework of the machine said sprocket chain receiving its motion from any desired part of the driving devices, say, the main shaft which drives the folding rolls of the first folder. The stub shaft 19 also carries a spur pinion 20 meshing with a corresponding pinion 21, the hub of which is splined on a shaft 22, so that it may be drawn into or out of mesh with the pinion 20. The shaft 22 extends transversely across the supporting framework as best illustrated in Figs. 10 and 12 and carries a gear wheel 23 which meshes with an idler sprocket 24, from which motion is directly imparted to the lowermost set of rolls 16 and thence through intervening idler pinions and shafts, to the succeeding pairs of rolls above it. By this means, the entire set of rolls is driven in such a direction that the paper will be fed downwardly between them.

It is to be understood that the rolls of each pair are set apart just a sufficient distance to positively hold the once folded sheet down on the laterally movable part of the cross feed mechanism and support it on such laterally movable part and prevent it from bending down by its own weight, but are not close enough together to present any appreciable friction against the paper and bar the transverse movement thereof toward the second folder. This transversely traveling portion of the cross feed mechanism, which is one of the improvements of the present invention, comprises a series of rollers or spools 25, mounted on separate shafts 25<sup>x</sup> secured at one end in a transversely extending bar 26 and arranged in a horizontal line as best indicated in Figs. 10 and 12. Each of the spools or rollers 25 is in the form of a double truncated cone. That is to say, each one has its periphery tapering toward the middle thereof as best illustrated in Fig. 13 and this middle point is disposed directly underneath the lowermost pair of rolls 16 so as to directly receive the paper or once folded sheet as it is fed downwardly thereupon by such rolls. In order to positively drive all of the rollers or spools 25, each one of them is provided with a sprocket wheel 27, and a sprocket chain 28 is so arranged that the upper stretch passes over and engages all of the sprocket wheels 27. The sprocket chain 28 also passes over a driving sprocket 29 which is journaled on a stub shaft 30 journaled in the cross bar 26 near one end thereof as best illustrated in Figs. 10 and 12. The wheel 29 receives its motion from a bevel pinion 31 secured to the shaft 22. In order to maintain the sprocket chain 28 at the requisite tension, I have provided a tension roller 32 journaled in the lower end of an arm 33 which is secured to and depends from the cross bar 26. By means of these double tapered or oppositely and inwardly beveled rollers or spools 25 the lower edge of the once folded sheet is maintained in a true plane, as the sheet travels transversely toward the second folder, and it is insured that the entire sheet will be thus presented to the second folder without any danger of crimping or rumpling in the operation thereof.

It is to be understood that any means may be employed for rotating the spools 25. For instance, instead of the sprocket chain 28 just above described and its correlated parts, I may use a construction and arrangement of parts such as is illustrated in Fig. 16. In this view, 25<sup>a</sup> designates the spools which are mounted on the stub shafts that are journaled in a cross bar 26<sup>a</sup>, the shafts of the spools being extended through the cross bar and carrying crown gear wheels 27<sup>a</sup> that mesh with spur gears 27<sup>b</sup> secured on the shaft 27<sup>c</sup> journaled in brackets 26<sup>b</sup> that project from the bar 26<sup>a</sup>. Motion may be communicated to the shaft 27<sup>c</sup> in any desired way as by the shaft 22<sup>b</sup> which is provided at one end with a bevel pinion 22<sup>c</sup> and its opposite end with a bevel pinion 22<sup>d</sup> meshing with the corresponding pinion 27<sup>d</sup> on one end of the shaft 27<sup>c</sup>. Bevel pinion 22<sup>c</sup> meshes with a corresponding pinion 22<sup>e</sup> on the shaft 22<sup>a</sup> which corresponds to the shaft 22 above described. In order that the bar 26 or 26<sup>a</sup> may be adjusted so that the series of spools which it carries may be held in a true horizontal line or at any desired height, said bar is pivotally mounted to swing about a substantially horizontal axis. In the present embodiment of the invention, although it is to be understood that the invention is not limited thereto, the said bar is mounted to swing about the shaft 30, as shown in Figs. 12 and 14, which carries the sprocket wheel 29, and an adjusting screw 29<sup>b</sup>, mounted in a bracket 29<sup>c</sup> bears against the opposite end of said bar so that the same may be vertically adjusted in an evident manner.

A<sup>2</sup> B<sup>2</sup> and C<sup>2</sup> designate respectively the triangularly arranged vertically disposed rolls of the second folder, the same being located at one end of the series of rollers or spools 25 as best illustrated in Fig. 10. As the once folded sheet is passed laterally in between the rolls A<sup>2</sup> and B<sup>2</sup>, it enters in between the vertically disposed and obliquely arranged stop plates 34 and 35 of the second folder in the right angle series. In order to properly stop the incoming sheet at the desired point so that the continued rotation of the rolls A<sup>2</sup> and B<sup>2</sup> will cause the sheet to buckle and be folded between the rolls B<sup>2</sup> and C<sup>2</sup> and form a second fold at right angles to the first, my improved stop is provided. This stop, as best seen in Fig. 9, embodies two spaced bars designated 36 and 37 to one of which are secured by brazing, soldering or by any desired means, laterally spaced and forwardly diverging curved fingers 38 between which the sheet passes. The bar 36 carrying the fingers 38 is mounted in between the plates 34 and 35, while the bar 37 is located on the outer side of the plate 34, thumb screws 39 working through and in the bars 36 and 37 so as to bind them securely in place after they have been adjusted to the desired point. It is to be understood that a corresponding stop device is provided for the third folder in the right angle series but as the parts of such folder are not essential to full disclosure of the present invention, a full description and illustration thereof are omitted, together with the stop bar therefor. It is to be understood, however, that such bar is exactly like the stop bar just described.

It is essential in some classes of work that the second folder in the right angle series be omitted and that the paper be folded only twice (the folds being at right angles to each other) and then passed directly to the stacking box. In order to accomplish this end, I have provided means whereby the second folder in the right angle series may be entirely cut out and the paper passed directly to the down feed mechanism which in turn will pass it to the third folder. In the present instance the arrangement of parts whereby I accomplish this result, includes a foot or base 40 which is formed on the plate 35 and which is arranged to be detachably secured as by stub bolts or the like, to a ledge 41 of the supporting framework, said ledge also supporting the rolls $A^2$, $B^2$ and $C^2$ as best illustrated in Fig. 10. I have also provided a deflector bar 42 shown best in Fig. 11. This deflector bar is provided with a base or foot 43 similar to the foot 40, so that the plates 34 and 35 may be entirely removed and the deflector bar 42 substituted therefor with its curved edge 43 vertically disposed in between the rolls $A^2$ and $C^2$ close to but spaced from the roll $B^2$. With this deflector in place, it is clear that as the once folded sheet is passed in between the rolls $A^2$ and $B^2$ it will be deflected by the curved edge 43 of the bar 42 and passed directly in between the rolls $B^2$ and $C^2$ which in turn will pass it between the obliquely disposed rolls 44 of the down feed mechanism which I shall now describe. This down feed mechanism constitutes the means for passing the twice folded sheet down into the third folder of the right angle series.

Referring now particularly to Figs. 1, 5, 6 and 10 it will be seen that the obliquely disposed rolls 44 are arranged in pairs, one pair above another, and that they are supported entirely at one end, the ends which are contiguous to the rolls $B^2$ and $C^2$ being entirely free and preferably rounded, so as to insure the proper entrance of the twice or once folded sheet between them. One roll 44 of each pair is journaled to rotate about a fixed axis in a bracket 45 secured to one of the framework bars, and the said bracket is provided with upper and lower pintle ears 46 spaced from each other as illustrated best in Fig. 5. 47 designates another pintle ear which is interposed between the ears 46, a pintle 48 passing through all of said ears, as shown. The pintle ear 47 is formed on a bar 49 which supports the other rolls of the pairs, and it will thus be seen that the rolls of one set may be correspondingly moved toward or away from their companion rolls so as to produce more or less divergence between the free ends of the rolls according to the requirements as for instance, the particular weight or thickness of the stock being worked upon. In order to properly adjust the rolls 44, an arm 50 projects outwardly and laterally from the pintle ear 47, said arm being forked at its extremity as indicated at $50^a$ and there being a bolt 51 provided which is received in the fork of the arm and which carries a nut at its outer end and which is threaded in the framework bar 52 at its opposite end as best illustrated in Fig. 6. A spring 53 encircles the bolt 51 and presses outwardly upon the arm 50 to hold the movable set of rolls 44 in a laterally yieldable as well as a laterally adjustable position. From Fig. 6 it will be seen that the rolls are directly geared with each other as at 54, and that one pair of rolls is operatively connected to the next pair of rolls above or below it by idlers, not shown, meshing with a spur pinion 55.

This present machine, like my prior patented machine above referred to embodies means for parallel folding. In parallel folding, it is sometimes necessary to make three folds each of which is parallel to the preceding, and it is also sometimes necessary to make only two folds. In order to accomplish this result, I have provided means which I shall now describe whereby the third parallel folder may be cut out and the twice folded sheet passed through the rolls of the third parallel folder directly without receiving the third fold, and passed into the stacking box. In the operation of parallel folding, the paper is passed through the rolls $A^1$ and $B^1$ into or between the plates 2 and 3 and thence between the rolls $B^1$ and $C^1$ to produce the first fold, but it is not passed into the cross feed mechanism such mechanism being turned to one side and swung away from underneath the rolls $B^1$ and $C^1$. The parallel folder is then swung into position (all as will be better understood by a reference to Fig. 11 of the prior patent 893,629 and the related description q. v.). The parallel folder embodies two rolls 56 and $56^a$ which coact with the buckling plates and stops (not shown) in making the third fold of the parallel series, and to omit the third fold, I substitute for such plates a deflector bar 57 which is secured by stud bolts or the like to ears 58 projecting laterally from the hanger arms 59 of the parallel folder, the paper being thereby passed by means of the curved edge 60 of the bar 57 directly out between the rolls 56 and 56ª without being folded the third time.

In addition to the deflectors above described it is to be understood that I may employ other deflectors one for instance at the rolls A¹ B¹ C¹ of the first folder and one for the rolls A³ B³ and C³ of the folder which is the third in the series in the operation of right angle folding, said last named rolls being illustrated in Fig. 17 and shown in operative relation to the other parts of the mechanism in my prior Patent 893,629 above referred to.

In the art of folding paper sheets, it is sometimes desirable not to make a fold in the first series of the folding rolls but to pass the sheet from the feed table 1 directly through these rolls so as to have it come in contact with slitters or creasers that are shown and described in my said prior patent, the paper being passed by said slitters or creasers to the second series of folders and folded. This is particularly desirable in certain grades of very heavy paper, especially where the fold is creased against the grain of the paper and aids in making a clean straight fold in paper of this class. To accomplish this end I may take off the folding plate of the first series of rolls A¹ B¹ and C¹ and substitute therefor a deflector bar 57ª such as is illustrated in Fig. 15 reference to which will show that the paper fed from the table 1 in between the rolls A¹ and B¹ will be directed by the curved edge of said deflector bar 57ª directly down between the rolls B¹ and C¹ into and between the rollers 16, whence it will pass onto the spools 25 and be shifted laterally onto and between the rolls A² and B².

In Fig. 17 I have indicated that a deflector bar such as 57ᵇ may be used in connection with the rolls A³ B³ and C³ which are designed primarily to produce the third fold in the sheet in the operation of right angle folding. This deflector bar is used when it is not desired to make the usual third right angle fold. Heretofore in such event, I have passed the paper down past the roll C³ feeding it into a stacker while the paper is in a vertical position, but as I have designed a stacker where it is better to feed the paper to it in a horizontal position, I use the deflector 57ᵇ to pass the paper out between the rolls B³ C³ directly to the stacker when it is only desired to make two right angle folds.

I have found by demonstration that there are certain papers of such a character that when the folding machine is driven at a very high speed such papers pass down through the down cross feed mechanism with so much force that on striking the feed spools, the papers rebound a little throwing them out of perfect alinement when they are presented for the second right angle fold. In order to overcome this tendency, I have provided a brush 61 (see Fig. 15) which is arranged between two pairs of down feed rollers 16 so as to engage with the paper as it is fed down between said rollers. In the present embodiment of the invention the brush 61 is attached to the frame which carries the rollers 16. The handle end of the brush is secured by a pin or thumb screw 62 to one arm of a bracket 63, said bracket being provided with a clamping bar 64 by which it may be adjustably and detachably held upon one of the spreader bars 65 of the frame the bracket 63 being slotted as indicated at 66 to provide for the adjustment of the brush. Manifestly by this means, the brush can be presented at various angles by adjustment upon the spreader bar 65 and the intensity of its effect upon the paper can be increased or lessened by adjusting the brush by means of the thumb screw 62.

From the foregoing description in connection with the accompanying drawings, the operation of my improved paper folding machine will be apparent, as I have described the different steps in the operation of the parts in connection with the construction and relative arrangement thereof. It may be stated, however, that the paper passes first over the table 1 into the rolls A¹ and B¹ and thence between the plates 2 and 3 of the first folder, where it is engaged by the heel 8 of the plate 4 by which it is stopped. It is then caught by and passed in between the rolls B¹ and C¹ and passed therefrom down between the rolls 16 onto the rollers or spools 25 or 25ª by which latter, in the operation of right angle folding, it is passed laterally into the rolls A² and B² and thence between the plates 34 and 35 of the second folder of the right angle series where it is stopped by the bar 36 and it is then again folded between the rolls B² and C² and passed between the laterally adjustable and yieldable rolls 44, the rotation of these last named rolls passing the twice folded sheet in between them and passing it downwardly at the same time into the third folder of the right angle series. From the third folder it preferably passes into a stacker. If desired, by the use of a deflector bar 42, the once folded sheet may be passed directly to the rolls 44 from the rolls 16 and spools 25. By the use of the deflector bar 57ª the sheet may be passed from the feed table to the second series of rolls A² B² and C² without being folded before it reaches said rolls, and by the use of the deflector bar 57ᵇ the sheet may be passed through the rolls B³ and C³, without receiving the third fold in the operation of right angle folding. It is to be understood that the plate 4 may be securely gripped to the folded plates 2 and 3, in any desired way, as by a thumb screw or bolt corresponding to the bolt 10, without any spring tensioning device.

Having thus described the invention, what is claimed as new is:

1. In a paper folding machine of the character described, the combination with upper and lower spaced folder plates, of a sheet stopping device embodying a plate adapted to rest on the upper surface of the upper folder plate, said folder plate being slotted and the sheet stopping plate being provided with a downwardly and forwardly projecting guide portion extending into the slot of said folder plate and formed with a sheet engaging heel, the forward end of said forwardly projecting guide portion being upwardly turned, and means for securing the stop plate to the slotted folder plate.

2. In a paper folding machine of the character described, the combination with a folder plate, the plate being formed with slots, and another plate arranged in spaced relation to the first named plate, of a sheet stopping device embodying a plate adapted to rest on said first named plate and overlapping one of the slots thereof, the plate being formed with a downwardly and forwardly projecting foot portion formed at its rear end with a heel arranged to constitute an abutment for the advancing edge of the sheet as it passes in between the folder plates and said forwardly projecting foot having an upwardly extending terminal portion, and means for securing the stop plate to the first named folder plate.

3. In a paper folding machine of the character described, the combination with a slotted folder plate and another folder plate arranged in spaced relation thereto, of a sheet stopping device embodying a plate adapted to rest on the first named folder plate and overlap one of the slots thereof, said plate being formed with a downwardly projecting foot having a forwardly projecting toe with an upwardly curved extremity, said foot and toe being adapted to project into the slot and the foot being formed with a transversely extending heel located in the space between the folder plates for the purpose specified and means for securing said stop plate to the first named folder plate.

4. In a sheet folding machine, the combination with spaced folder plates, one of which is formed with slots, of a stop plate adapted to rest on the slotted folder plate and overlap one of the slots thereof, said stop plate being formed with a sheet engaging element projecting into the slot, a nut adapted to enter said slot and formed with retaining lugs arranged to extend into the space between the folder plates, the nut being also formed with oppositely curving side walls terminating in shoulders arranged to engage the side walls of said slot, and a bolt passing through the stop plate into the nut and working in the latter, as and for the purpose set forth.

5. In a sheet folding machine, the combination with spaced folder plates, one of which is formed with slots, of a stop plate adapted to rest on the slotted folder plate and overlap one of the slots thereof, said stop plate being formed with a sheet engaging element projecting into the slot, a nut adapted to enter said slot and formed with retaining lugs arranged to extend into the space between the folder plates, the nut being also formed with oppositely curving side walls terminating in shoulders arranged to engage the side walls of said slot, a bolt passing through the stop plate into the nut and working in the latter, and an expansion spring coiled around the bolt and pressing against the plate.

6. In a sheet folding machine, the combination with spaced folder plates one of which is formed with slots, of a stop plate adapted to rest on one of said folder plates and overlap one of the slots thereof, said stop plate being formed with a downwardly and forwardly projecting foot extending into the slot, the foot being provided with a heel depending therefrom and lying in the space between the folder plates, a nut adapted to enter said slot and formed with retaining lugs arranged to extend in the space between the folder plates, the nut being also formed with oppositely curving side walls terminating in shoulders arranged to engage the side walls of said slot, and a bolt passing through the stop plate into the nut and working in the latter as and for the purpose set forth.

7. In a paper folding machine of the character described the combination with folder plates, of a sheet stopping device embodying spaced bars one of which is provided with corresponding guide fingers and thumb screws passing through said bars and adapted to clamp the same to the folder plates.

8. In a paper folding machine of the character described, the combination with spaced folder plates, of a sheet stopping device embodying bars one of which is adapted to be inserted between said plates and the other lying against the outer face of one of the plates, one of said bars being formed with guide fingers, and thumb screws passing through said bars and clamping the same to the folder plates.

9. In a paper folding machine of the character described the combination with folder plates, of a sheet stopping device embodying spaced bars one of which is provided with guide fingers outwardly curved at their extremities away from each other, and thumb screws arranged to clamp said bars to the folder plates.

10. In a machine for folding by the buckling process embodying a first folder and a second folder, the latter being arranged to produce a fold in a sheet at right angles to the fold produced by the first folder, the herein described cross feed mechanism adapted to pass the sheet from the first folder to the second folder, said mechanism embodying a vertical series of down feeding rolls, a supporting bar pivotally mounted at one end for movement in a vertical plane and disposed below the lowermost of said downward feeding rolls, a series of parallel shafts journaled in and extending through said bar in juxtaposition to each other and arranged in a common plane, spools carried by said shafts directly beneath the down feeding rolls at one side of the bar, a driving element disposed at the pivotal axis of the supporting bar, and gearing carried by the said bar and operatively connecting the driving element and the spools whereby to rotate the spools simultaneously in the same direction.

11. In a paper folding machine of the character described, embodying a set of horizontally disposed rolls and a set of vertically disposed rolls, means for feeding the sheet downwardly from the first set of rolls and thence laterally to the second set, the same consisting of a plurality of pairs of down feeding rolls, a series of rollers or spools arranged in a horizontal line underneath said down feeding rolls in line with the second set of rolls, each roller or spool being provided with a sprocket wheel, a sprocket chain extending over said sprocket wheels, a driving sprocket over which said chain also passes, a shaft on which said driving sprocket is mounted, a bevel pinion also mounted on said shaft, another shaft, a bevel pinion mounted on said last named shaft, and meshing with said first named pinion, and means for driving said last named shaft and a gearing connection between said last named shaft and the sheet feeding rolls.

12. In a paper folding machine of the character described the combination with a supporting framework and two sets of folding rolls mounted therein, one set at right angles to the other, of a cross bar secured in the framework below one of said sets of rolls, a series of stub shafts mounted in said crossbar, rollers or spools mounted on the respective shafts, sprocket wheels also mounted on said shafts and adapted to move said rollers or spools, a sprocket chain extending over said sprockets, means for driving said sprocket chain, the rollers or spools being in line with the other set of rolls, and down feeding rolls adapted to pass a sheet from one set of rolls to the rollers or spools, the latter being arranged to then pass the sheet to the second set of rolls.

13. In a machine for folding by the buckling process, three rolls similar in all respects arranged in a triangularly disposed series with a space between two of said rolls, buckling plates coöperating with said rolls, and a rigid deflector bar interchangeable with said buckling plates and secured at one end at a point removed from the rolls and having a head at one side approximately co-extensive with the space between the spaced rolls, said head being inserted in said space and having a smooth continuous concave face corresponding in curvature to and disposed concentric with the periphery of the third roll.

14. In a machine for folding by the buckling process, three rolls similar in all respects arranged in a triangularly disposed series with a space between two of said rolls, buckling plates coöperating with said rolls, and a deflector bar interchangeable with the buckling plates and extending radially to the third roll and having a head at one side approximately co-extensive with the space between the spaced rolls, said head being inserted in said space and having a concavely curved face fitting close to the third roll, and said bar being formed with an attaching base at one end.

15. In a paper folding machine, sheet passing mechanism adapted to pass a sheet from one folder to another and embodying a pair of rolls supported at one end only and adapted to be shifted into relatively divergent relation, means for permitting the free end of one roll to yield laterally so as to swing away from the corresponding end of the other roll, and adjustable means for limiting the movement of the rolls toward each other.

16. In a paper folding machine, sheet passing rolls adapted to pass a sheet from one folder to another, the rolls being arranged in laterally disposed obliquely extending pairs, one roll of each pair being mounted on a fixed axis and the other roll being mounted on an axis which is hingedly supported whereby to permit said hinged rolls to move at one end toward and away from the corresponding ends of the first named rolls.

17. In a paper folding machine, sheet passing rolls adapted to pass a sheet from one folder to another, the same being arranged in pairs, means for rotatably supporting one roll of each pair to rotate about a fixed axis, such rotatable rolls being supported at one end only, a hinged support on which the other rolls are mounted at one end only, and means for rotating said rolls.

18. In a paper folding machine, sheet passing rolls adapted to pass a sheet from one folder to another, said rolls being arranged in pairs, means for rotatably supporting one roll of each pair to rotate about a fixed axis, a yielding support on which the other rolls are mounted at one end only, and means for rotating said rolls.

19. In a paper folding machine, sheet passing rolls adapted to pass a sheet from one folder to another, said rolls being arranged in pairs adapted to receive a sheet between them, a stationary support in which one roll of each pair is supported at one end to rotate about a fixed longitudinal axis, said support being provided with pintle ears, a bar in which the other rolls are supported at one end to rotate about their longitudinal axes, said bar being formed with a pintle ear, a pintle extending through said ears whereby to hinge said bar to the relatively stationary support, an arm 50 projecting from the last named pintle ear, and means connected to said arm whereby to adjust the position of the movable rolls relative to the other rolls.

20. In a paper folding machine, sheet passing rolls adapted to pass a sheet from one folder to another, said rolls being arranged in pairs adapted to receive a sheet between them, a stationary support in which one roll of each pair is supported to rotate about a longitudinal axis, said support being provided with pintle ears, a bar in which the other rolls are supported at one end only to rotate about their longitudinal axes, said bar being formed with a pintle ear, and an arm projecting therefrom, a pintle extending through said ears whereby to hinge said bar to the relatively stationary support, a relatively stationary spring encircled bolt, and a nut working on said bolt and engaging said arm to move it in one direction against the tension of said spring.

21. In a paper folding machine, sheet passing rolls adapted to pass a sheet from one folder to another, the same being arranged in pairs, means for rotatably supporting one roll of each pair to rotate about a fixed axis, such rotatable rolls being supported at one end only, and a yieldable support on which the other rolls are mounted at one end only, and means for rotating said rolls.

22. In a paper folding machine, sheet passing rolls adapted to pass a sheet from one folder to another, said rolls being arranged in pairs adapted to receive a sheet between them, a stationary support in which one roll of each pair is supported at one end to rotate about a longitudinal axis, said support being provided with pintle ears, a bar in which the other rolls are supported at one end only to rotate about their longitudinal axes, said bar being formed with a pintle ear, a pintle extending through said ears whereby to hinge the bar to the relatively stationary support, and means for adjustably and yieldingly connecting said bar to the support.

23. In a paper folding machine, sheet passing rolls adapted to pass a sheet from one folder to another, said rolls being arranged in pairs, a relatively stationary support in which one roll of each pair is mounted to rotate, a bar having a hinged connection to said support and supporting the other rolls so that the latter may be swung away from or toward their corresponding rolls, said bar also embodying an arm, a bolt connected to said arm and to the support, an expansion spring encircling said bolt and bearing against said arm, and a nut working on said bolt and adapted to compress said spring.

24. A folding machine comprising a series of three rolls similar in all respects arranged in triangular relation with a space between two of the rolls, and buckling plates and deflector bars constructed to be interchangeably supported at a point removed from the rolls with one end in juxtaposition to said rolls, the deflector bars having heads to bridge the space between the spaced rolls and fit close to the periphery of the third roll but out of contact with all the rolls.

In testimony whereof I affix my signature in presence of two witnesses.

OLIVER W. JOHNSON. [L. S.]

Witnesses:
C. D. ADAMS,
ANNA AMIDON.